(12) United States Patent
Park

(10) Patent No.: US 7,342,960 B2
(45) Date of Patent: Mar. 11, 2008

(54) DATA STORAGE UNIT FOR IMAGE COMPRESSION DEVICE

(75) Inventor: Hyun-Sang Park, ChonAn-shi (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 872 days.

(21) Appl. No.: 10/753,823

(22) Filed: Jan. 8, 2004

(65) Prior Publication Data

US 2004/0146112 A1    Jul. 29, 2004

(30) Foreign Application Priority Data

Jan. 14, 2003    (KR) ...................... 10-2003-0002473

(51) Int. Cl.
*H04N 7/12*    (2006.01)
*H04N 11/02*    (2006.01)

(52) U.S. Cl. ........................... 375/240.01; 375/240.12; 348/714

(58) Field of Classification Search ........... 375/240.01, 375/240.12; 382/232; 348/714, 715
See application file for complete search history.

(56) References Cited

U.S. PATENT DOCUMENTS

| 5,493,514 | A | 2/1996 | Keith et al. ................. 364/514 |
| 6,195,389 | B1 * | 2/2001 | Rodriguez et al. ..... 375/240.16 |
| 6,466,624 | B1 * | 10/2002 | Fogg ..................... 375/240.27 |
| 6,519,286 | B1 * | 2/2003 | Porter et al. ........... 375/240.13 |

* cited by examiner

*Primary Examiner*—Gims Philippe
*Assistant Examiner*—Erick Rekstad
(74) *Attorney, Agent, or Firm*—F. Chau & Associates, LLC

(57) ABSTRACT

A data storage unit of an image compression device for compressing motion picture frame is provided. The data storage unit comprises: a previous frame field having a plurality of slices; a decoded frame field having a plurality of slices; and a current frame field having a plurality of slices, wherein the previous frame field stores a previously decoded image and the decoded frame field stores a currently decoded image, wherein the number of slices of the previous frame field is greater than the number of slices of the decoded frame field and the current frame field.

10 Claims, 6 Drawing Sheets

DATA STORAGE UNIT FOR IMAGE COMPRESSION DEVICE

BACKGROUND OF THE INVENTION

1. Technical Field

The present disclosure relates to data storage unit, more particularly, data storage unit for image compression device.

2. Discussion of the Related Art

The Motion Picture Experts Group (MPEG) has established standards for coding audio-visual information such as movies, video, and music in a digitally compressed format. Thus, motion pictures such as movies can be compressed and transmitted in digitally compressed format.

MPEG-4 is a standard for multimedia for fixed and mobile networks in the digitally compressed format. MPEG-4 also provides an object-based coding where the shape, motion, and the texture of video objects are coded separately. H.263 is a standard for a compression format in transmitting data from video phones through links of non-video phone applications.

In mobile communication networks, MPEG-4 or H.263 standards can be applied to compress images introduced through applications such as digital cameras. Storage of images after compressed coding reduces the amount of memory required to store the images. To replay the images, the compressed data is retrieved and decoded to recover the original images.

As shown in FIG. 1, a conventional technology of motion picture process uses three fields of frame memories: a current frame field (CF) for storing an original image to be compressed; a decoded frame field (DF) for storing a frame decoded from the compressed current frame; a previous frame field for (PF) for storing the decoded frame of prior image. Each frame field includes luminance (Y) and chrominance (Cb/Cr).

As shown in FIG. 2, in the conventional technology, each frame uses 176×144×1.5 pixels to store one image frame structured of YUV 4:2:0 QCIF (Quarter Common Intermediate Format). The field of the luminance component is segmented into nine slices, each of which contains 176×16 pixels.

To obtain a decoded image of a current image, motion estimation is carried out for the current image with reference to a decoded image of a prior image. Then, a decoded image of current image is created by summing the decoded image of prior image with the reconstructed residual image between the current image and the decoded prior image. It is stored in the decoded frame field (DF). A decoded frame of a current frame, e.g. $N^{th}$ frame, is considered as a previous frame at each sequential step for the next image frame, e.g. $(N+1)^{th}$ frame.

In the conventional technology, each processing step for every input frame uses three frame fields, i.e. CF, DF, and PF. Thus, a three inter-frame compression uses memory capacity of: 114 Kbytes (176×144×1.5×3 pixels) for YUV 4:2:0 QCIF; 456 Kbytes (352×288×1.5×3 pixels) for YUV 4:2:0 CIF; and 1382 Kbytes (640×480×1.5×3 pixels) for YUV 4:2:0 VGA format.

In video devices having large memory capacity, storage of the afore-described frame fields may not pose a significant problem. In mobile video devices such as handheld computers, phones, or PDAs, physical size and power consumption are premium design factors. Reduced memory capacity and power consumption greatly contribute to product appeal.

SUMMARY OF THE INVENTION

According to an aspect of the present disclosure, a data storage unit of an image compression device is provided, the image compression device for processing motion pictures represented in frames, the data storage unit comprising a previous frame field for storing N slices of a previous frame; a decoded frame field for storing M slices of a decoded frame; and a current frame field for storing K slices of a current frame, wherein N, K, and M are natural numbers and N is greater than K or M, wherein the current frame field includes a first slice storing an image to be compressed at present and a second slice storing an image to be compressed next.

K is determined by CEILING [SR/16]+1, wherein SR is a maximum value of a motion estimation range and CEILING is an integer function. Preferably, K is 2 when SR is 16, M is an integer equal to or larger than 2.

According to another aspect of the disclosure, the decoded frame field migrates by a two-slice pitch after completion of a decoding operation for the current frame when motion estimated ranges from −16 pixels to 15 pixels. The decoded frame field migrates by a three-slice pitch after completion of a decoding operation for the current frame when motion estimated ranges from +15 pixels to +31 pixels, wherein the migration is to a region of N+K slices forming the previous and decoded frame fields. The data storage unit is preferably embedded in the image compression device.

A memory of an image compression device is also provided, the image compression device for compressing a motion picture represented in frames of N slices, the memory comprising: a luminance region and a chrominance region; the luminance region includes: a previous luminance frame field composed of N slices; a decoded luminance frame field composed of K slices, K being smaller than N; and a current luminance frame field composed of M slices; and the chrominance memory region includes: a previous chrominance frame field composed of N half slices; a decoded chrominance frame field composed of K half slices: and a current chrominance frame field composed of M half slices, wherein N is an integer and K and M are smaller than N.

The decoded luminance frame field migrates with a K-slice pitch in a region of the N+K slices forming the previous and decoded chrominance frame fields, wherein the decoded chrominance frame field migrates with a K-half slice pitch in a region of the N+K half slices forming the previous and decoded chrominance frame fields. The N+K half slices region does not migrate in the slices occupying the decoded chrominance frame field from the previous chrominance frame field.

BRIEF DESCRIPTIONS OF DRAWINGS

Preferred embodiments of the invention are described with reference to the accompanying drawings, of which:

DETAILED DESCRIPTION OF PREFERRED EMBODIMENTS

The present disclosure will be described more fully hereinafter with reference to the accompanying drawings, in which preferred embodiments of the disclosure are shown. This disclosure may, however, be embodied in many different forms and should not be constructed as being limited to the embodiments set forth herein.

For this disclosure, "frame" is referred to as a unit of image or picture transferred in a unit time. "Frame field" is referred to as a space in a memory, which stores the frame. "Slice" is referred to as a unit area of the frame and is preferably 176×16 pixels for QCIF resolution. "Macro block" is referred to as a unit area in a slice for motion estimation and is preferably 16×16 pixels.

Generally, a compression process for motion pictures includes encoding motion pictures to be transmitted and decoding the transmitted motion pictures in units of frames. For encoding motion pictures to be transmitted, input images are represented in individual frames. A frame can include differences between the motion-compensated frame with reference to a previous frame. The difference signals are processed with operations such as discrete cosine transformation (DCT), quantization, and variable length coding.

Bit streams output after the variable length coding are transmitted to a communication network channel through output buffers as an encoded image signal. Upon reception, the received signal is decoded by a variable length decoding, inverse quantization and inverse discrete cosine transformation (IDCT) to recover the difference signal. The restored difference image signals are added to signals compensated from the previous decoded image to be referred in motion-compensation process to reconstruct the current image.

According to an embodiment of the present disclosure, motion pictures are in the form of YUV 4:2:0 QCIF with the resolution of 176×144 pixels. The vector range of the motion estimation is from −16 pixels to +15 pixels in the vertical/horizontal direction. The present disclosure is also applicable to image formats such as CIF (352×288 pixels per a frame), or VGA (640×480 pixels per a frame).

Figure 1:
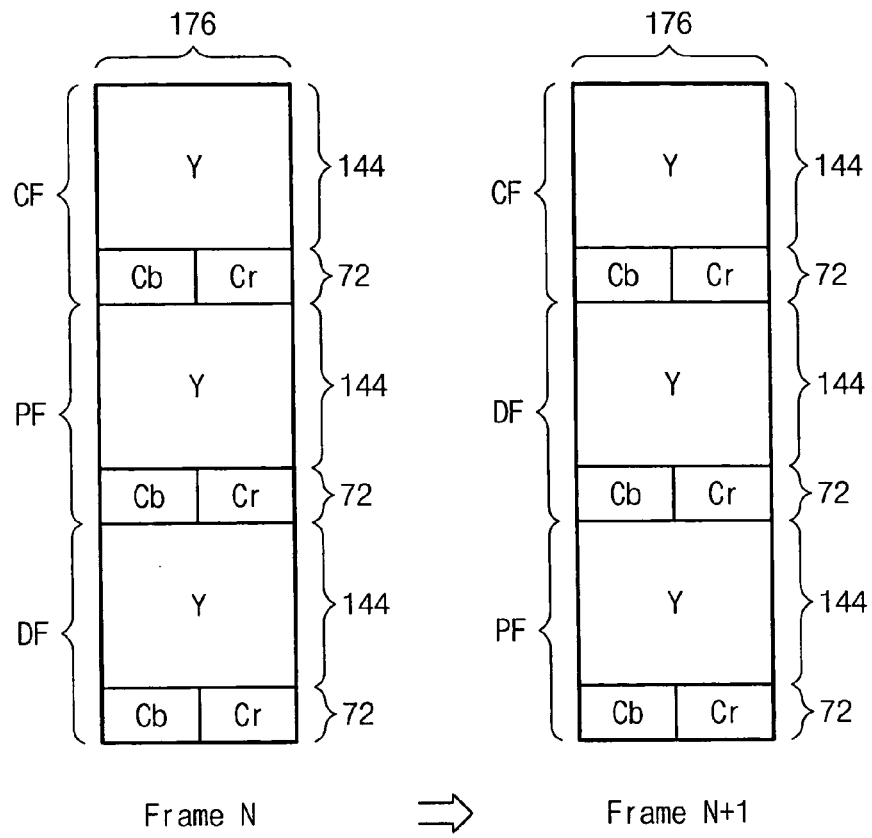
FIG. 1 shows a conventional memory structure for use in a motion picture compression device.
Figure 2:
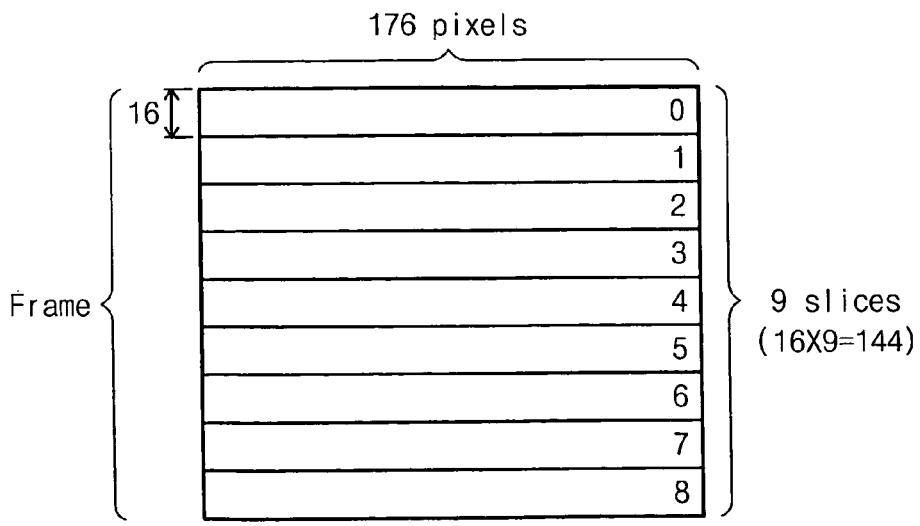
FIG. 2 shows storage of a unit luminance frame in the conventional memory.
Figure 3:
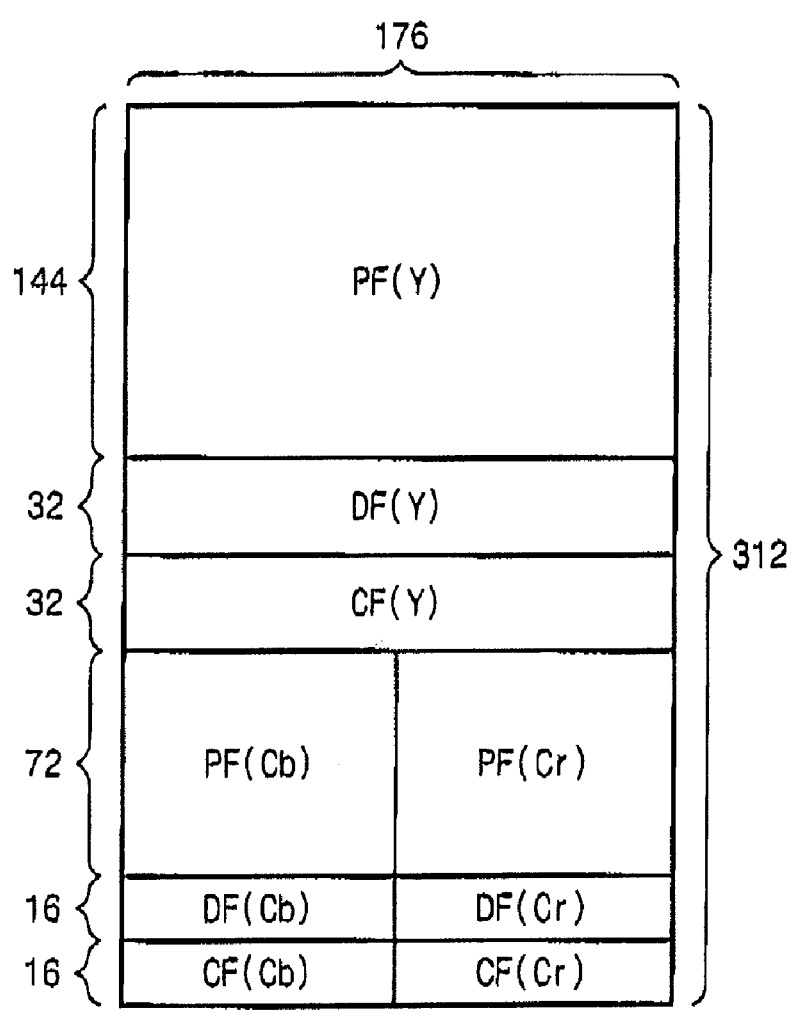
FIG. 3 shows a memory structure according to an embodiment of the present disclosure.

According to an embodiment of the present disclosure, a memory for storing current and decoded frames during image compression for motion pictures has memory field structure as shown in FIG. 3. The memory field can be arranged in a single memory embedded in a mobile electronic device such as a portable motion-picture terminal.

The memory field includes: 176×48 pixels current frame fields CF (Y/Cb/Cr) for storing current frames received from an image input application such as a camera; 176×16 pixels decoded chrominance frame fields DF (Cb) and DF (Cr) for storing decoded frames of chrominance signals; and 176×72 pixels previous chrominance frame fields PF (Cb) and PF (Cr) for storing previous frames of chrominance signals. The memory field further includes a decoded luminance frame field DF (Y) for storing a decoded frame of luminance signals, and a previous luminance frame field PF (Y) for storing a previous frame of the luminance signals. Each frame field is formed of a plurality of slices.

The frame fields for the chrominance signals is a half of the luminance frame fields. The size for a slice of the luminance signal is 16×16 pixels. The size for a slice of the chrominance signal is 16×8 pixels. The luminance frame fields, PF (Y) and DF (Y), interact with each other. The chrominance frame fields, PF(Cb/Cr), DF(Cb/Cr), and the current frame fields CF(Y/Cb/Cr) are independent from each other. One ordinary skilled in the art can readily appreciate that the positioning of the frame fields may be variable within the memory.

Figure 4:
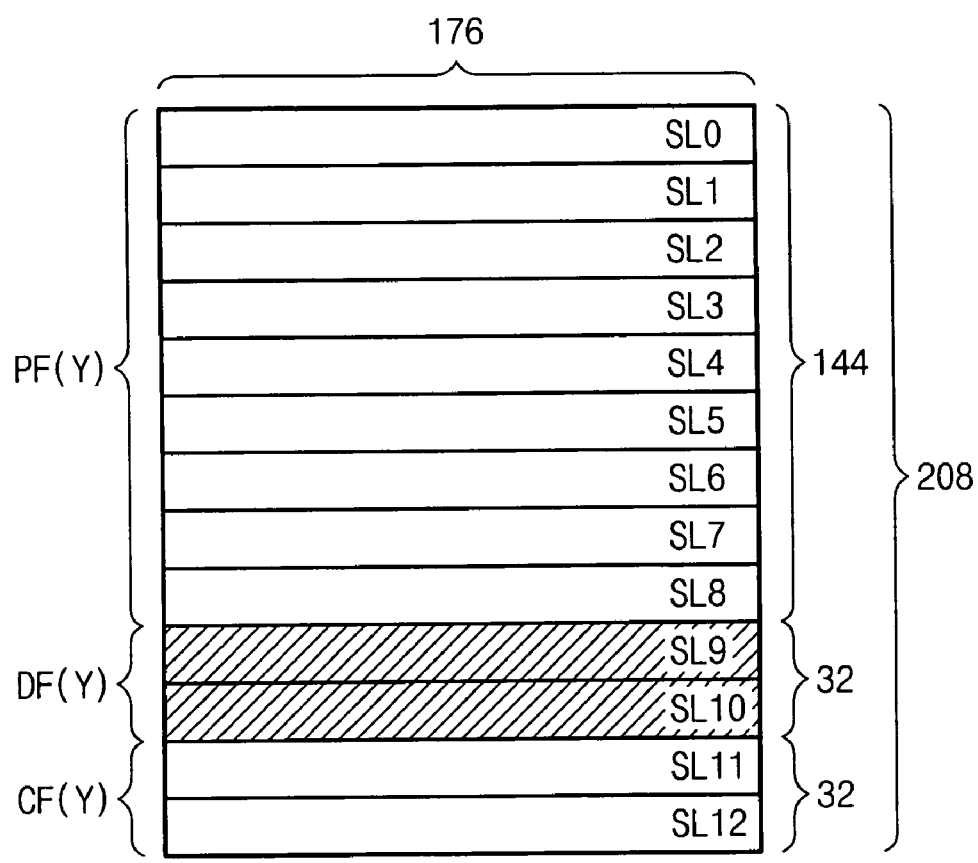
FIG. 4 shows a memory map for storing luminance frame in the memory of FIG. 3.

FIG. 4 shows a memory map for storing a luminance signal in a memory of the present disclosure. The size of previous luminance frame field PF (Y) is 176×144 pixels, with nine slices from SL0 to SL8. The size of decoded luminance field DF (Y) is 176×32 pixels and contains two slices, SL 9 and SL 10. The current luminance frame field CF (Y) belongs to the frame field CF (Y/Cb/Cr), i.e., the current frame field is shared by the luminance and chrominance image signals. The current luminance frame field CF(Y) is two slices, SL11 and SL12. Two slices of the current luminance frame field CF(Y) allows simultaneously a write operation for storing the input image into the memory and a read operation for the motion picture compression. Thus, a field of thirteen slices are used for compression of the luminance signal component of the input motion picture frame. Conventionally, 27 slices of the same luminance signal components are required.

Figure 5:
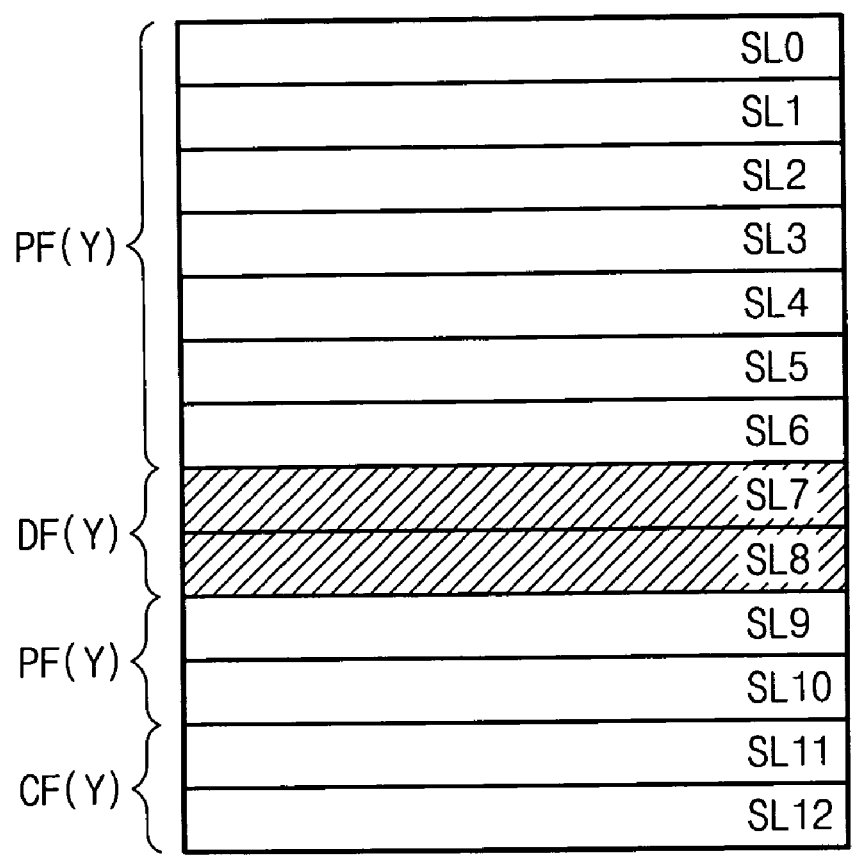
FIG. 5 shows a memory map for storing decoded luminance frame.

FIG. 5 shows a memory map for storing decoded luminance frame. To compress a current image storing in the first slice SL11 or SL12, slices SL0 or SL1 are used to conduct motion estimation/compensation for the first slice. Then, slice SL9 stores a decoded image for the first slice. To compress the second slice SL12 or SL11, slices SL0, SL1, and SL2 are used to conduct motion estimation/compensation for the second slice. Then, slice SL10 stores a decoded image for the second slice.

Figure 6:
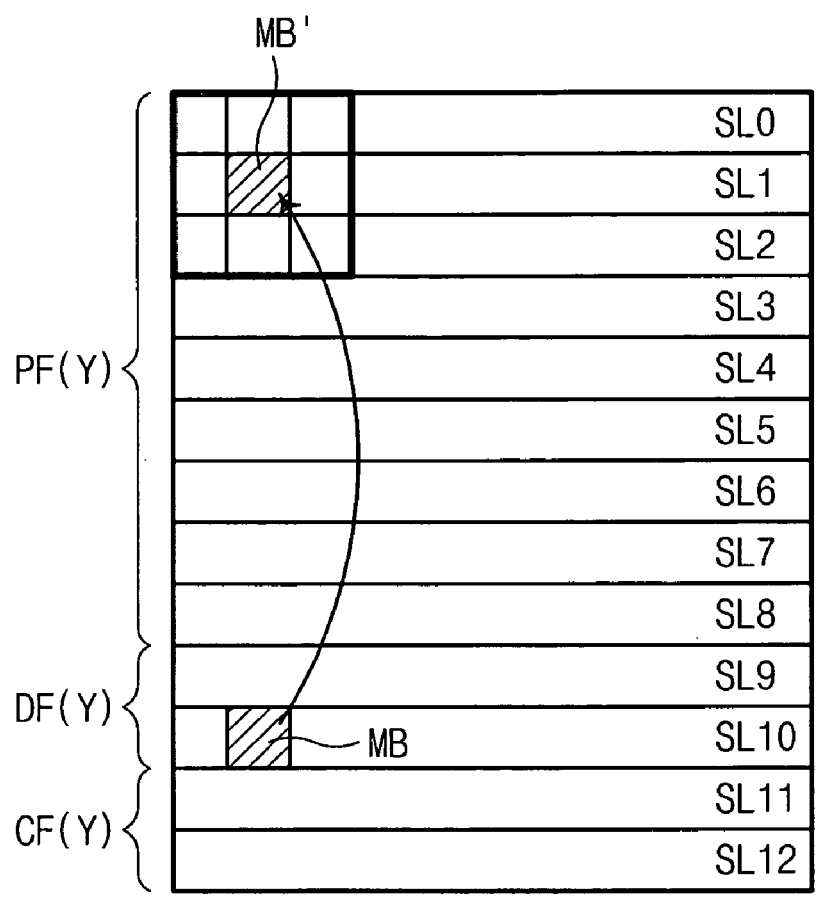
FIG. 6 shows an exemplary motion estimation decoding process of the present disclosure.

The motion compensation accompanies with a process of motion estimation as shown in FIG. 6. The second (from the left) macro block MB belongs to the slice SL10 of the decoded image for the slice SL12 of the current image. The range of motion estimation is from −16 pixels to +15 pixels. Eight macro blocks enclosing a macro block MB' corresponding to MB in the slice SL1 are assigned to the motion estimation for the current macro block MB. A difference signal obtained from the motion estimation/compensation is applied to form a decoded image as being added to the motion-compensated image value. After storing the decoded image of the slice SL12 into the slice SL10, the next decoded slice is stored from the slice SL0.

Once a decoding process for the image stored in the current frame field CF(Y) is completed, a new image is introduced into the current frame field CF(Y). Then, the same compression steps are repeated. After completing the compression procedure for the current frame field CF(Y), the decoded images are stored in the slices SL9, SL10, SL0, SL1, SL2, SL3, SL4, SL5, and SL6 in order. Thus, SL9, SL10, SL0, SL1, SL2, SL3, SL4, SL5, and SL6 form the previous frame field PF(Y) and SL7 and SL8 form the decoded frame field DF(Y) for the next image frame to be input. Positions of the slices are varied after completing the compression steps for each current frame.

A starting position of the decoded frame field DF(Y) moves upward by a two-slice pitch after completing the decoding operation for the current frame field CF (Y). The order of storing the decoded slices for one image frame is from SL9, SL10, SL0, SL1, SL2, SL3, SL4, SL5, SL6, SL7, to SL8. The number of storing of the slices, eleven, is the same with the number of the slices composing the previous and decoded frame fields.

Figure 7:
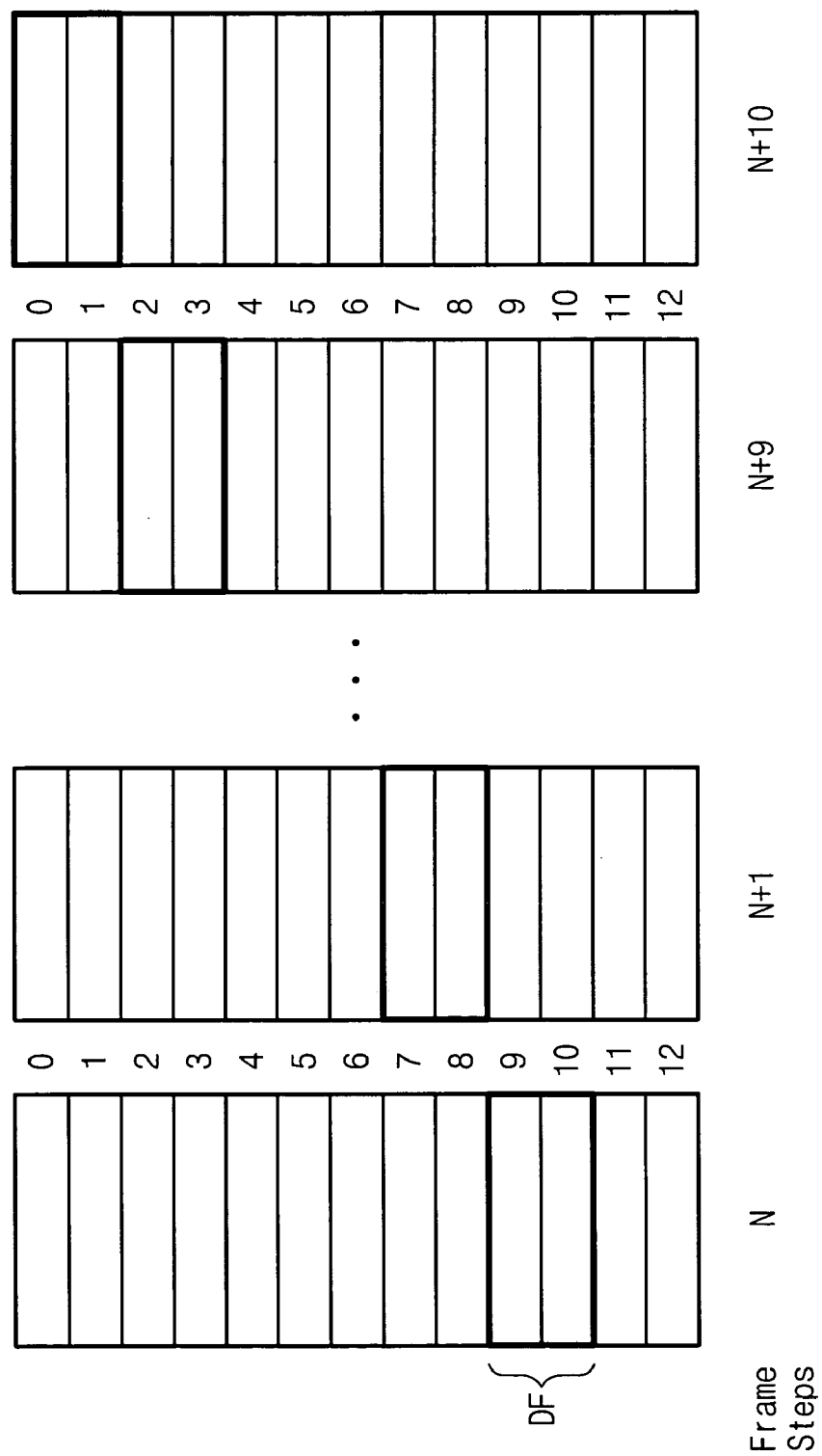
FIG. 7 shows the sequential migration of the decoded frame stage during the decoding procedure.

FIG. 7 shows the sequential migration of the decoded frame stage during the decoding process. Since the current frame field CF (Y) is composed of two slices, e.g. SL11 and SL12, the decoded frame field DF(Y) moves upward by a two-slice pitch at each compression step.

A range of the motion estimation contributes to determining the number of slices composing the decoded frame field. The number of slices of the decoded frame field is established by:

CEILING [SR/16]+1 wherein SR is the maximum value of the motion estimation range.

CEILING [] results in the minimum value among integers equal to or larger than the factor. If the number of slices of the previous frame field PF (Y) is N and the number of slices of the decoded frame field DF (Y) is K, the number of slices composing the previous and decoded frame fields can be obtained from N+CEILING [SR/16]+1. Thus, SR is 16 when the motion estimation range is from −16 pixels to +15 pixels, the number of slices of the decoded frame field DF(Y), K, is two (2). The total number of the slices composing the previous and decoded frame fields is 9+2=11.

If the motion picture estimation range is from −32 pixels to +32 pixels, the number of slices of the decoded frame field becomes three (3) since K=CEILING [32/16]+1=3. Thus, the number of slices composing the previous and decoded frame field is twelve.

One ordinary skilled in the art can readily appreciate that the compression procedure for the luminance components can be used in the chrominance components where the slice size is a half of the luminance components.

According to at least one embodiment of the present invention, memory capacity used for storage of data for motion picture compression is reduced. For instance, for the QCIF type, the conventional case of 27 (9×3) slices is reduced to 13 slices, a 52% reduction in memory capacity. Table 1 shows the effects of memory capacity reduction according to the embodiments of the present disclosure in processing motion pictures.

TABLE 1

| Motion Picture Format | Required Memory Capacity | |
|---|---|---|
| | Conventional Case | Present Disclosure |
| QCIF (176 by 144) | 114 KB | 55 KB (52% saved) |
| CIF (352 by 288) | 456 KB | 189 KB (59% saved) |
| VGA (640 by 480) | 1382 KB | 522 KB (62% saved) |

Although preferred embodiments of the present disclosure have been described in detail hereinabove, it should be clearly understood that many variations and/or modifications of the basic inventive concept herein taught which may appear to those skilled in the present art will still fall within the spirit and scope of the present disclosure, as defined in the appended claims.

What is claimed is:

1. A memory of an image compression device, the image compression device for compressing a motion picture represented in frames of N slices, the memory comprising:
    a luminance region and a chrominance region;
    the luminance region includes:
    a previous luminance frame field composed of N slices;
    a decoded luminance frame field composed of K slices, K being smaller than N; and
    a current luminance frame field composed of M slices; and
    the chrominance memory region includes:
        a previous chrominance frame field composed of N half slices;
        a decoded chrominance frame field composed of K half slices: and
        a current chrominance frame field composed of M half slices, wherein N is an integer and K and M are smaller than N.

2. The memory of claim 1, wherein the number of pixels in the half slice is vertically a half of that in the slice belonging to the luminance region.

3. The memory of claim 1, wherein the decoded luminance frame field migrates with a K-slice pitch in a region of the N+K slices forming the previous and decoded chrominance frame fields.

4. The memory of claim 1, wherein the decoded chrominance frame field migrates with a K-half slice pitch in a region of the N+K half slices forming the previous and decoded chrominance frame fields.

5. The memory of claim 4, wherein the N+K half slices region does not migrate in the slices occupying the decoded chrominance frame field from the previous chrominance frame field.

6. The memory of claim 1, wherein K is expressed as CEILING[SR/16]+1, wherein SR is a maximum value of a motion estimation range and CEILING is an integer function.

7. The memory of claim 6, wherein K is 2 when SR is 16.

8. The memory of claim 6, wherein K is 3 when SR is 32.

9. The memory of claim 1, wherein M is an integer equal to or greater than 2.

10. The memory of claim 1, wherein the memory is embedded in the image compression device.

* * * * *